US012646139B2

(12) United States Patent
Yao

(10) Patent No.: US 12,646,139 B2
(45) Date of Patent: Jun. 2, 2026

(54) IMAGE DOWNSAMPLING METHOD AND IMAGE PROCESSING SYSTEM USING THE IMAGE DOWNSAMPLING METHOD

(71) Applicant: PixArt Imaging Inc., Hsin-Chu City (TW)

(72) Inventor: Wen-Han Yao, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 0 days.

(21) Appl. No.: 18/614,729

(22) Filed: Mar. 24, 2024

(65) Prior Publication Data

US 2024/0394832 A1     Nov. 28, 2024

Related U.S. Application Data

(60) Provisional application No. 63/468,014, filed on May 22, 2023.

(51) Int. Cl.
*G06T 3/40* (2024.01)
*H04N 7/18* (2006.01)
*H04N 23/667* (2023.01)
*H04N 23/80* (2023.01)

(52) U.S. Cl.
CPC .............. *G06T 3/40* (2013.01); *H04N 7/183* (2013.01); *H04N 23/80* (2023.01); *H04N 23/667* (2023.01)

(58) Field of Classification Search
CPC ......... G06T 3/40; G06T 3/4015; H04N 7/183; H04N 23/80; H04N 23/667; H04N 25/707; H04N 7/18; H04N 25/40
See application file for complete search history.

(56) References Cited

U.S. PATENT DOCUMENTS

| | | | | | |
|---|---|---|---|---|---|
| 2006/0256121 | A1* | 11/2006 | Hsieh | | G06T 1/60 |
| | | | | | 345/544 |
| 2012/0194720 | A1* | 8/2012 | Bowers | | H04N 25/447 |
| | | | | | 348/E5.091 |
| 2013/0011050 | A1* | 1/2013 | Rissa | | G06T 7/90 |
| | | | | | 382/167 |
| 2022/0399387 | A1* | 12/2022 | Noh | | H10F 39/8063 |
| 2024/0214672 | A1* | 6/2024 | Chen | | H04N 23/651 |
| 2024/0323564 | A1* | 9/2024 | Chen | | H04N 25/46 |

* cited by examiner

*Primary Examiner* — Farzana Hossain
(74) *Attorney, Agent, or Firm* — Winston Hsu

(57) ABSTRACT

An image down-sampling method, for down-sampling a sensing image comprising a plurality of first pixels and a plurality of second pixels which are alternatively arranged, comprising: generating a first output pixel value according to at least one pixel value of at least one of the first pixel in a first down-sampling group; wherein the first down-sampling group comprises an odd number of pixels. By this way, the saw-tooth image issue in prior art may be improved. If the image down-sampling method is applied to a surveillance camera, the accuracy of event detection of the surveillance camera may be increased.

18 Claims, 5 Drawing Sheets

IMAGE DOWNSAMPLING METHOD AND IMAGE PROCESSING SYSTEM USING THE IMAGE DOWNSAMPLING METHOD

CROSS REFERENCE TO RELATED APPLICATIONS

This application claims the benefit of U.S. Provisional Application No. 63/468,014, filed on May 22, 2023. The content of the application is incorporated herein by reference.

BACKGROUND OF THE INVENTION

1. Field of the Invention

The present invention relates to an image down-sampling method and an image processing system, and particularly relates to an image down-sampling method and an image processing system which can prevent saw-tooth images.

2. Description of the Prior Art

An image sensor of a conventional surveillance camera may use a pre-roll mode (or named as a buffer mode) to store images captured in recently N seconds, so that when an event (e.g., a person) is identified, the image sensor may hold images happened before and after the event. In the pre-roll mode, the image sensor may utilize down-sampling to generate images to decrease power consumption. However, conventional down-samplings may induce saw-tooth images which may be resulted from non-uniform sampling or aliasing. The saw-tooth images may cause wrong event decisions of the surveillance camera.

SUMMARY OF THE INVENTION

One objective of the present invention is to provide an image down-sampling method which may improve the saw-tooth image issue.

Another objective of the present invention is to provide an image processing system which may improve the saw-tooth image issue.

One embodiment of the present invention discloses an image down-sampling method, for down-sampling a sensing image comprising a plurality of first pixels and a plurality of second pixels which are alternately arranged, comprising: generating a first output pixel value according to at least one pixel value of at least one of the first pixel in a first down-sampling group; wherein the first down-sampling group comprises an odd number of pixels.

Another embodiment of the present invention discloses an image processing system, comprising: an image sensor, configured to generate a sensing image comprising a plurality of first pixels and a plurality of second pixels which are alternatively alternately arranged; and a processing circuit, configured to generate a first output pixel value according to at least one pixel value of at least one of the first pixel in a first down-sampling group; wherein the first down-sampling group comprises an odd number of pixels.

In view of above-mentioned embodiments, down-sampling of pixel values can be performed using groups of odd pixels to produce the output image. By this way, the saw-tooth image issue in prior art may be improved.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present invention. It will be appreciated that the term "first", "second", "third" in following descriptions are only for the purpose of distinguishing different one elements, and do not mean the sequence of the elements. For example, a first device and a second device only mean these devices can have the same structure but are different devices.

Figure 1:
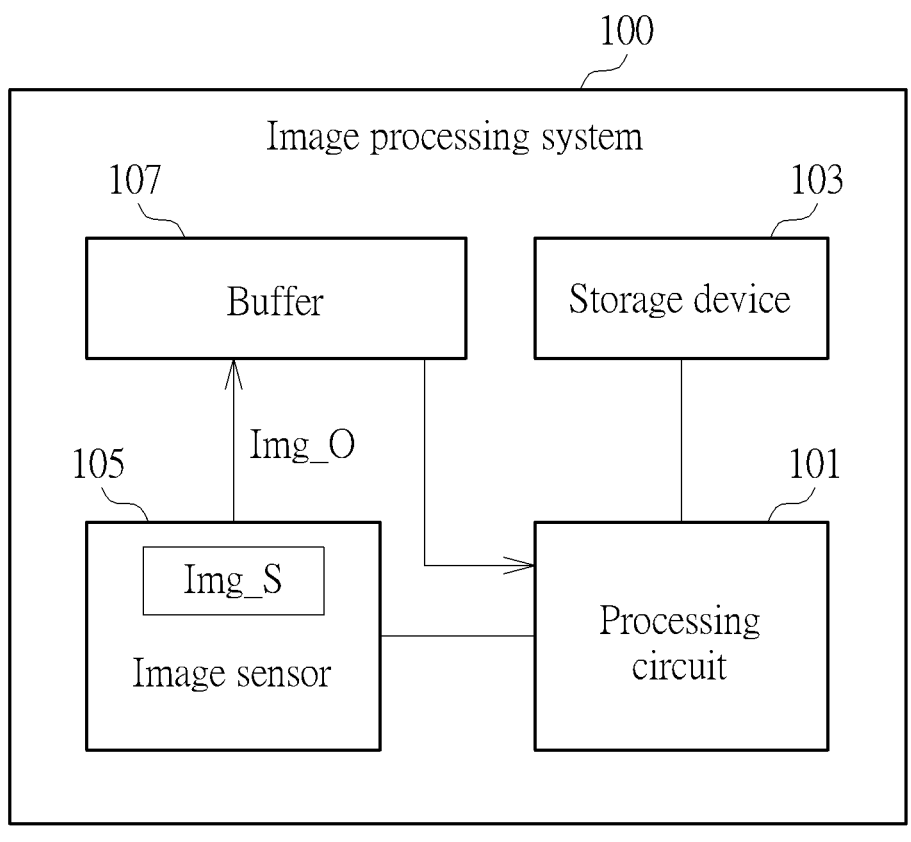
FIG. 1 is a block diagram illustrating an image processing system according to one embodiment of the present invention.

FIG. 1 is a block diagram illustrating an image processing system 100 according to one embodiment of the present invention. As shown in FIG. 1, the image processing system 100 comprises a processing circuit 101, a storage device 103, an image sensor 105, and a buffer 107. The processing circuit 101 is configured to execute at least one program in the storage device 103 to control the image sensor 105 to perform an image down-sampling method provided by the present invention. The processing circuit 101 may control operations of other devices of the image processing system 100. The image sensor 101 is configured to perform the image down-sampling method to generate output images Img_O. In one embodiment, the buffer 107 is configured to buffer the output images Img_O for further processing. In one embodiment, the image processing system 100 is a surveillance camera, and the buffer 107 is configured to store output images Img_O generated in a predetermined time (e.g., recent N seconds), so that when an event (e.g., a person) is identified, the processing circuit 100 may hold images happened before and after the event.

In another embodiment, the surveillance camera does not performs the image down-sampling method in a normal mode, thus generates the image sensing image Img_S for event detection. Further, the surveillance camera performs the image down-sampling method in a standby mode, thus generates the output image Img_O which is down-sampled for event detection. By this way, the power consumption in the standby mode may be reduced. Detail steps of the image down-sampling method will be described in following embodiments.

Figure 2:
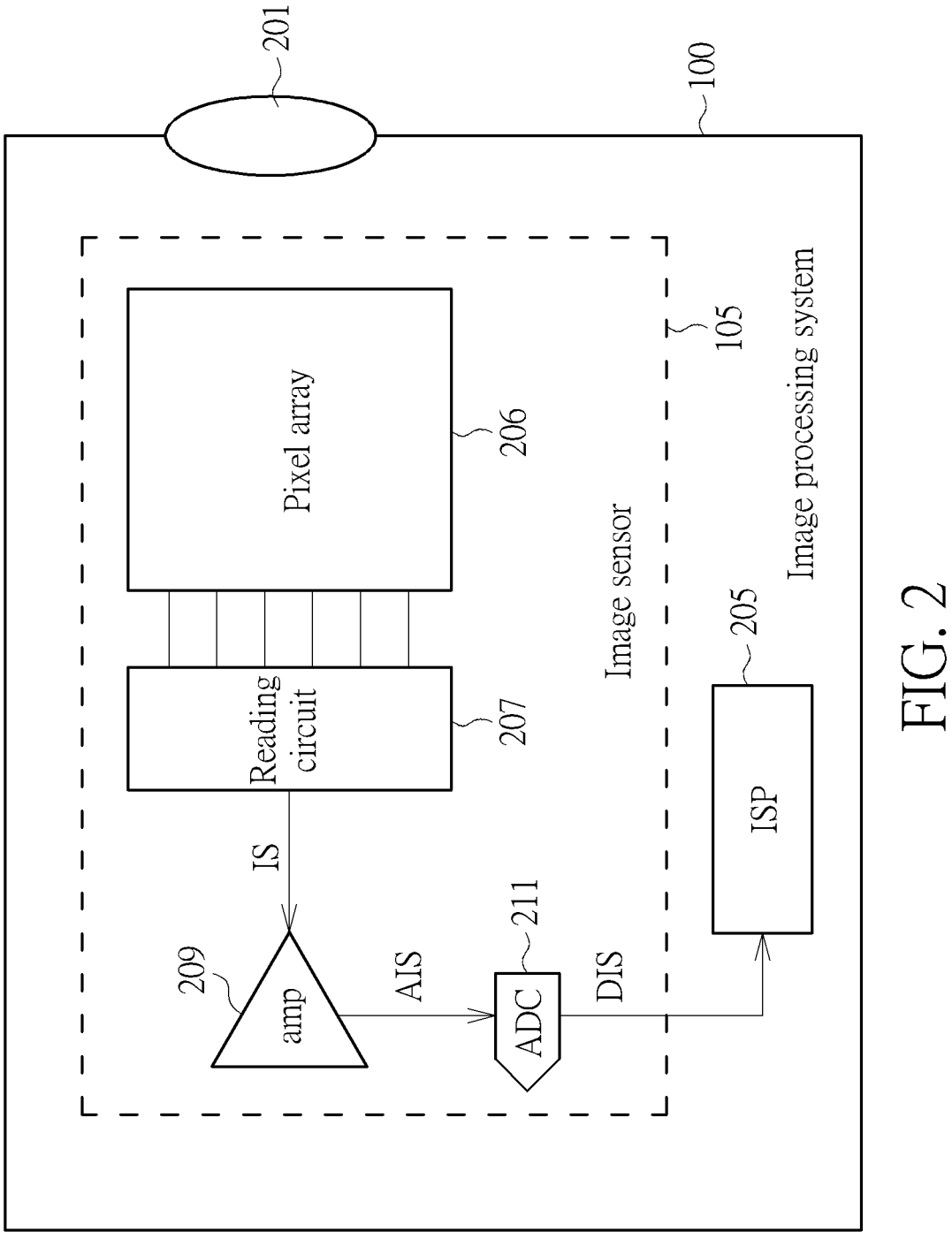
FIG. 2 is a block diagram illustrating a detail structure of the image sensor in FIG. 1, according to one embodiment of the present invention.

FIG. 2 is a block diagram illustrating a detail structure of the image sensor in FIG. 1. It will be appreciated that the methods illustrated in following embodiments is not limited to be implemented by the image processing system 100 shown in FIG. 1 and FIG. 2. In one embodiment, the image processing system 100 is a camera, and may be an independent electronic device or be integrated to another electronic device such as a mobile phone or a tablet computer.

As shown in FIG. 2, the image processing system 100 comprises a lens 201, the image sensor 105 and an ISP 205. The image sensor 105 comprises a pixel array 206, a reading circuit 207, an image signal amplifying circuit 209, and an ADC 211. The pixel array 206 comprises a plurality of pixels which generate sensing charges corresponding to the received light passing through the lens 201. The reading circuit 207 is configured to read the sensing charges to generate the image signal IS.

The image signal amplifying circuit 209 is configured to amplify the image signal IS to generate an amplified image signal AIS. The amplified image signal AIS is transmitted to an ADC 211 to generate a digital image signal DIS (the pixel values). The digital image signal DIS is transmitted to an ISP (Image Signal Processor) 205, which may perform the above-mentioned image down-sampling method to down-sample the digital image signal DIS to generate the output image Img_O. If the digital image signal DIS is not down-sampled, the ISP 205 generates the above-mentioned sensing image Img_S. The ISP 205 may be integrated to the image sensor 105, independent from the image sensor 105 or be integrated to the processing circuit 101.

In other words, the digital image signal DIS generated by the ADC 211 can be regarded as raw image signals. Such raw image signals may be processed by the ISP 205 without down-sampling to generate the sensing image Img_S, or be processed by the ISP 205 with down-sampling to generate the output image Img_O. For the convenience of explaining, the sensing image Img_S is used for illustrating the image down sampling method in following embodiments. However, the image down sampling method provided by the present invention may be applied to the raw image signals or applied to the sensing image Img_S. Accordingly, in following embodiment, the description "down-sampling a sensing image" may mean down-sampling raw image signals of the sensing image Img_S or mean down-sampling the sensing image Img_S.

Figure 5:
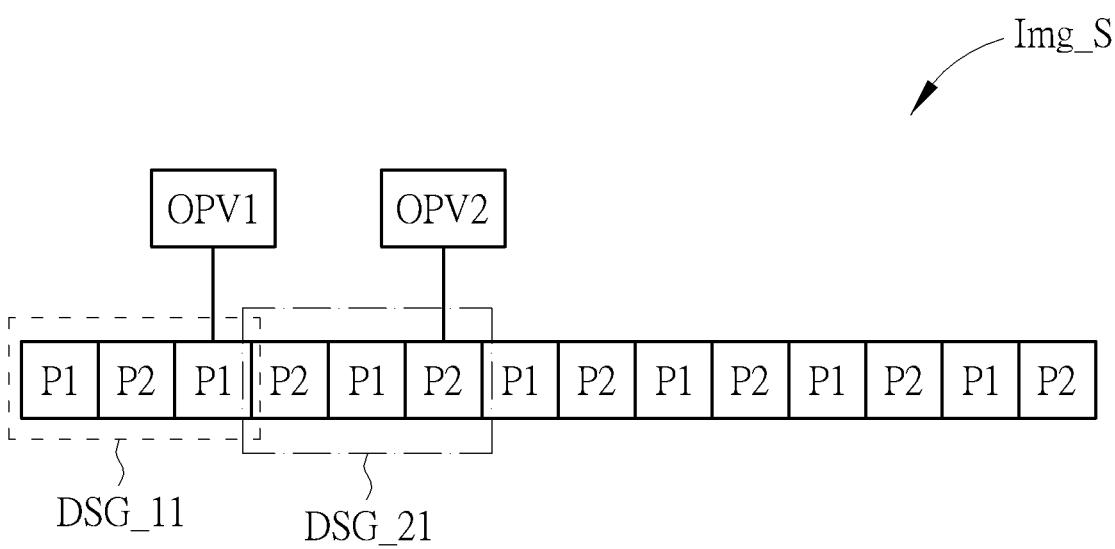
Figure 6:
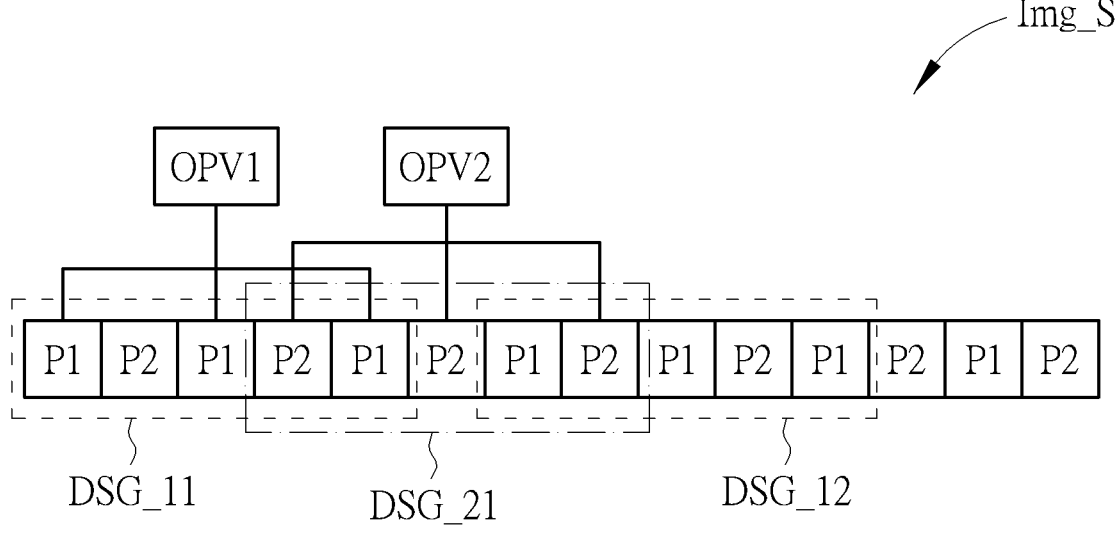
Figure 7:
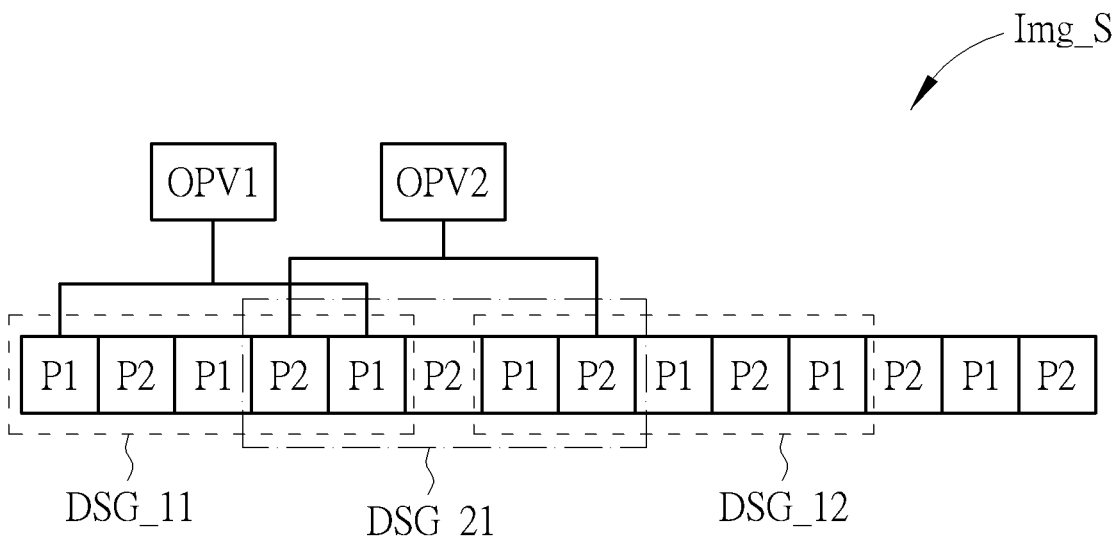

FIG. 3, FIG. 4, FIG. 5, FIG. 6 and FIG. 7 are schematic diagrams illustrating an image down sampling method according to embodiments of the present invention. As shown in FIG. 5, FIG. 6 and FIG. 7, the sensing image Img_S comprises a plurality of first pixels P1 and a plurality of second pixels P2 which are alternately arranged. The first pixels P1 and P2 may be any type of pixel. In one example, the first pixels P1 are G pixels and the second pixels P2 are B pixels. In another example, the first pixels P1 are R pixels and the second pixels P2 are IR pixels. The embodiment illustrated in FIG. 3, FIG. 4 also comprises a plurality of first pixels and second pixels, but the first pixels and second pixels are marked by different symbols, for the convenience of explaining. In the embodiments of FIG. 3, FIG. 4, FIG. 5, FIG. 6 and FIG. 7, a first output pixel value is generated according to at least one pixel value of at least one of the first pixels in a first down-sampling group. The first down-sampling group comprises an odd number of pixels. Please note, in following embodiments, each down-sampling group generates only one output pixel value. However, each down-sampling group can generate more than one output pixel values.

The down-sampling groups may have various arrangements. Also, the output pixel values may be generated by various ways. In one embodiment, the first down-sampling group comprises an even number of the first pixels (e.g., the first pixels P11, P12) and an odd number of the second pixels (e.g., the second pixel P21), such as the first down-sampling group DSG_11 in FIG. 3. In another embodiment, the first down-sampling group comprises an odd number of the first pixels (e.g., the first pixel P16) and an even number of the second pixel (e.g., the second pixels P25, P26), such as the first down-sampling group DSG_12 in FIG. 3. In such embodiment, pixel values of the first pixels may be down-sampled to generate the first output pixel value OPV1 or pixel values of the second pixels may be down-sampled to generate the second output pixel value OPV2. For example, if the first down-sampling group DSG_11 comprises five pixels, pixel values of the first pixels may be down-sampled to generate the first output pixel value OPV1 or pixel values of the second pixels may be down-sampled to generate the second output pixel value OPV2. In following embodiments, a symbol Pxv is used for explaining, which means the value of the pixel Px. For example, P11v means a pixel value of the first pixel P11 in FIG. 3 and FIG. 4.

Figure 3:
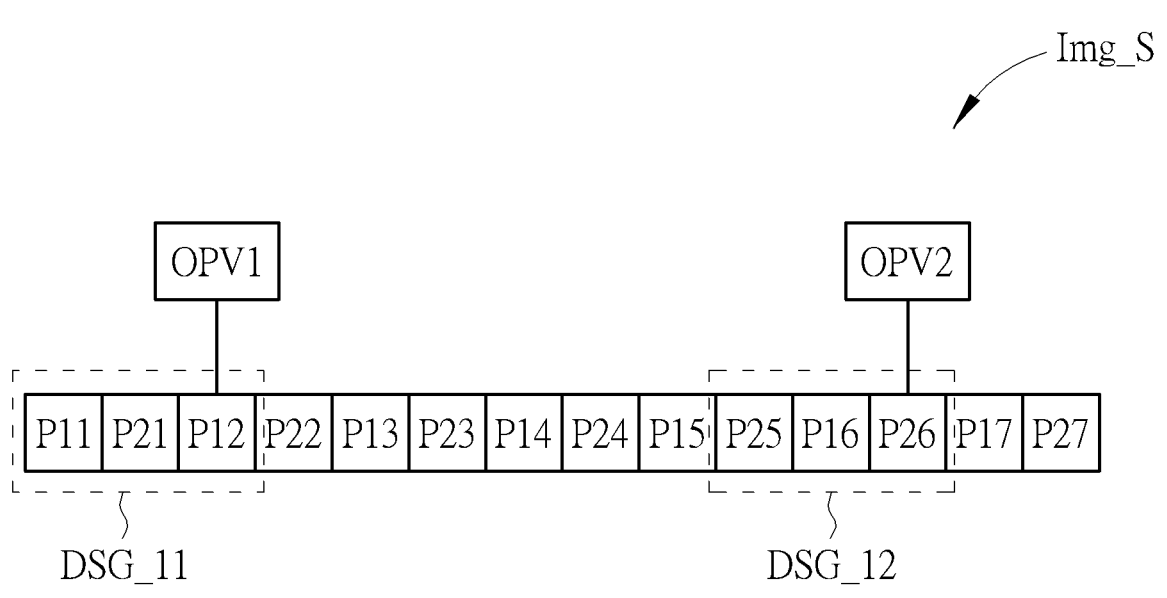
FIG. 3, FIG. 4, FIG. 5, FIG. 6 and FIG. 7 are schematic diagrams illustrating an image down sampling method according to embodiments of the present invention.
Figure 4:
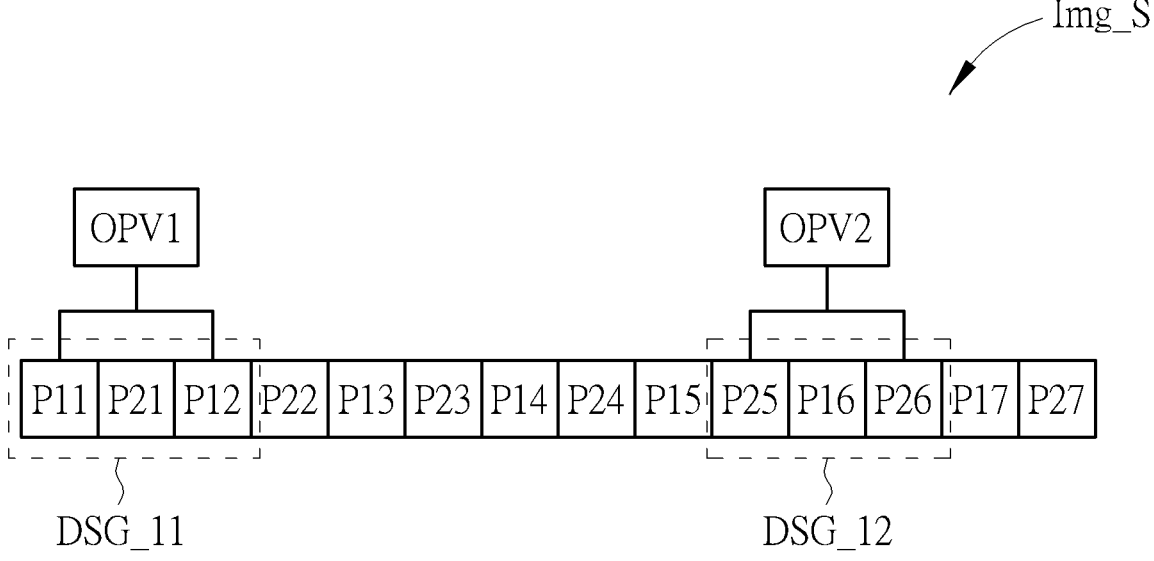

In the embodiment of FIG. 3, only the pixel value of the rightmost or the leftmost first pixel in the first down-sampling group may be output as the first output pixel value OPV1. Thus, the first pixels are down-sampled. In such case, the pixel value of the second pixel P21, which is not down-sampled, may also be output as the first output pixel value OPV1. Accordingly, the pixel values (P11v, P21v, P12v) in the first down-sampling group DSG_11 in the sensing image Img_S are down-sampled to generate the pixel value P11v, P21v or P12v in the first down-sampling group DSG_11 in the output image Img_O. Following the same way, the pixel values (P25v, P16v, P26v) in the first down-sampling group DSG_12 in the sensing image Img_S are down-sampled to generate the pixel value P25v, P16v or P26v in the first down-sampling group DSG_12 in the output image Img_O.

In one embodiment, the first output pixel value OPV1 or the second output pixel value OPV2 is selected according to a number of the pixels of the same type. For example, in the first down-sampling group DSG_11 of FIG. 3, the first pixels P11, P12 account for the majority, thus the pixel value P11v or P12v is selected as the first output pixel value OPV1. Following the same rule, in the first down-sampling group DSG_12 of FIG. 3, the second pixels P25, P26 account for the majority, thus the pixel value P25v or P26v is selected as the second output pixel value OPV2. Such rule may be applied to other embodiments.

In one embodiment, the first output pixel value is generated by averaging pixel values of at least two of the first pixels in the first down-sampling group. For example, in the embodiment of FIG. 4, the arrangements of the first down-sampling group DSG_11 and the first down-sampling group DSG_12 are the same as which of the first down-sampling group DSG_11 and the first down-sampling group DSG_12 in FIG. 3. However, in the embodiment of FIG. 4, pixel values of the first pixels in the first down-sampling group are averaged to generate the first output pixel value OPV1.

Accordingly, the pixel values (P11v, P21v, P12v) in the first down-sampling group DSG_11 in the sensing image Img_S are down-sampled to generate the pixel value P21v or P1av in the first down-sampling group DSG_11 in the output image Img_O. The pixel values P21v, P1av may be selectively used corresponding to different design requirements. Following the same way, the pixel values (P25v, P16v, P26v) in the first down-sampling group DSG_12 in the sensing image Img_S are down-sampled to generate the pixel value P16v or P2av in the first down-sampling group DSG_12 in the output image Img_O. The pixel values P16v, P2av may be selectively used corresponding to different design requirements.

In one embodiment, the first output pixel value OPV1 or the second output pixel value OPV2 is selected according to a number of the pixels of the same type. For example, in the first down-sampling group DSG_11 of FIG. 4, the first pixels P11, P12 account for the majority, thus the pixel value P1av is selected as the first output pixel value OPV1. Following the same rule, in the first down-sampling group DSG_12 of FIG. 4, the second pixels P25, P26 account for the majority, thus the pixel value P2av is selected as the second output pixel value OPV2. Such rule may be applied to other embodiments.

In view of above-mentioned descriptions, in one embodiment, the first down-sampling groups which comprise an even number of the first pixels and an odd number of the second pixel such as the first down-sampling group DSG_11, are down-sampled, and the first down-sampling groups which comprise an odd number of the first pixels and an even number of the second pixel such as the first down-sampling group DSG_12, are not down-sampled. On the contrary, in another embodiment, the first down-sampling groups which comprise an even number of the first pixels and an odd number of the second pixel are not down-sampled, and the first down-sampling groups which comprise an odd number of the first pixels and an even number of the second pixel, are down-sampled.

However, in another embodiment, the first down-sampling groups which comprise an even number of the first pixels and an odd number of the second pixel and the first down-sampling groups which comprise an odd number of the first pixels and an even number of the second pixel are all down-sampled. Additionally, in one embodiment, pixel values of the second pixels in the first down-sampling groups are down-sampled, or the pixel values of the first pixels in the first down-sampling groups are down-sampled. Such variations may also be contained in the scope of the present invention.

However, these two embodiments may be combined. In the embodiment of FIG. 5, the sensing image Img_S comprises a first down-sampling group DSG_11, and further comprises a second down-sampling group DSG_21. The arrangements of the second down-sampling group DSG_21 in FIG. 5 is the same as which of the first down-sampling group DSG_12 in FIG. 4. Accordingly, following the above-mentioned steps, the second down-sampling group DSG_21 in the sensing image Img_S is down-sampled to generate the pixel value P2av or Plv in the second down-sampling group DSG_21 in the output image Img_O. In the embodiment of FIG. 5, the first down-sampling group DSG_11 and the second down-sampling group DSG_21 are both down-sampled, thus all of the sensing image Img_S may be down-sampled since the first down-sampling group DSG_11 and the second down-sampling group DSG_21 are alternately arranged.

In the embodiment of FIG. 5, the first down-sampling group and the second down-sampling group have totally different pixels. However, in some embodiments, the first down-sampling group and the second down-sampling group share at least one pixel. In the embodiment of FIG. 6, the first down-sampling group DSG_11 and the second down-sampling group DSG_21 share a first pixel P1 and a second pixel P2. Also, pixel values of the first pixels P1 in the first down-sampling group DSG_11 of the sensing image Img_S may be averaged to generate the first output pixel value OPV1. Similarly, the pixel values of the second pixels P2 in the second down-sampling group DSG_21 of the sensing image Img_S may be averaged to generate the second output pixel value OPV2.

By this way, the pixel values (P1v, P2v, P1v, P2v, P1v) of the first down-sampling group DSG_11 of the sensing image Img_S are down-sampled to a pixel value Plav or P2v of the output image Img_O. Similarly, the pixel values (P2v, P1v, P2v, P1v, P2v) of the second down-sampling group DSG_21 of the sensing image Img_S are down-sampled to a pixel value P1v or P2av of the output image Img_O. Besides, in the embodiment of FIG. 6, all of the pixels of the sensing image Img_S may be down-sampled, since the first down-sampling group DSG_11 and the second down-sampling group DSG_21 may be alternately arranged. For example, in the embodiment of FIG. 6, the sensing image Img_S further comprises a first down-sampling group DSG_12 after the first down-sampling group DSG_11. The first down-sampling group DSG_12 also shares a first pixel P1 and a second pixel P2 with the second down-sampling group DSG_21.

In the embodiment of FIG. 6, pixel values of all of the first pixels P1 in the first down-sampling group DSG_11 and pixel values of all of the second pixels P2 in the second down-sampling group DSG_21 are averaged to generate pixel values. However, in one embodiment, the first output pixel value OPV1 may be generated by pixel values of only a portion of the first pixels P1 in the first down-sampling group DSG_11, and the second output pixel value OPV2 may be generated by pixel values of only a portion of the second pixels P2 in the second down-sampling group DSG_21. As shown in the embodiment of FIG. 7, in the first down-sampling group DSG_11, only pixel values of the rightmost first pixel P1 and the leftmost first pixel P1 are averaged to generate the first output pixel value OPV1. Additionally, in the second down-sampling group DSG_21, only pixel values of the rightmost second pixel P2 and the leftmost second pixel P2 are averaged to generate the second output pixel value OPV2.

The image down-sampling method provided by the present invention is not limited to the above-mentioned embodiments. All or a portion of steps disclosed in each embodiment may be combined to another embodiment. For example, in the embodiment of FIG. 6, the pixel value of a rightmost first pixel P1 in the first down-sampling group DSG_11 may be directly used as the first output pixel value. Besides, the image down-sampling method provided by the present invention may be applied to an image has different pixels which are alternately arranged, such as a Bayer pattern.

Based upon the embodiments illustrated in FIG. 3, FIG. 4, FIG. 5, FIG. 6 and FIG. 7, the image down sampling method provided by the present invention may have a rule: the first down-sampling group comprises pixels which are not down-sampled. For example, the second pixel P21 in the first down-sampling group DSG_11 in FIG. 3 are not down-sampled. For another example, the second pixel P2 in the first down-sampling group DSG_11 in FIG. 5 is not down-sampled.

Also, the image down sampling method provided by the present invention may have another rule: a number of the pixels of the first down-sampling group may be odd times of a number of the first output pixel value. For example, in the embodiment of FIG. 3, a number of the pixels of the first down-sampling group DSG_11 is 3 and a number of the first output pixel value OPV1 is 1. For another example, in the embodiment of FIG. 5, a number of the pixels of the first down-sampling group DSG_11 is 5 and a number of the first output pixel value OPV1 s 1. In other words, the output pixel value of the output image Img_O is generated every N pixels of the sensing image Img_S, and N is an odd number. The above-mentioned rules may also be applied to the second down-sampling group DSG_21 illustrated in the embodiments of FIG. 5, FIG. 6 and FIG. 7. AS above-mentioned, the number of the output pixel values may be more than 1.

In view of above-mentioned embodiments, an image down sampling method can be acquired. The image down sampling method is used for down-sampling a sensing image comprising a plurality of first pixels and a plurality of second pixels which are alternately arranged. The image down sampling method comprises: generating a first output pixel value according to at least one pixel value of at least one of the first pixel (e.g., the first pixel P1 in FIG. 3 FIG. 4, FIG. 5, FIG. 6 and FIG. 7) in a first down-sampling group. The first down-sampling group comprises an odd number of pixels. Other detail steps may be acquired in view of above-mentioned embodiments, thus descriptions thereof are omitted for brevity here.

In view of above-mentioned embodiments, down-sampling of pixel values can be performed using groups of odd pixels to produce the output image. By this way, the sawtooth image issue in prior art may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image down-sampling method, for down-sampling a sensing image comprising a plurality of first pixels and a plurality of second pixels which are alternately arranged, comprising:
   generating a first output pixel value according to at least one pixel value of at least one of the first pixels in a first down-sampling group;
   wherein the first down-sampling group comprises an odd number of pixels;
   wherein the image down-sampling method further comprises:
   generating a second output pixel value according to at least one pixel value of at least one of the second pixels in a second down-sampling group;
   wherein the first down-sampling group and the second down-sampling group share at least one pixel.

2. The image down-sampling method of claim 1, wherein the first down-sampling group comprises an even number of the first pixels and an odd number of the second pixels.

3. The image down-sampling method of claim 1, wherein the first down-sampling group comprises an even number of the second pixels and an odd number of the first pixels.

4. The image down-sampling method of claim 1,
   wherein the first down-sampling group comprises an even number of the first pixels and an odd number of the second pixels;
   wherein the second down-sampling group comprises an even number of the second pixels and an odd number of the first pixels.

5. The image down-sampling method of claim 1, wherein the first output pixel value is generated by averaging pixel values of at least two of the first pixels in the first down-sampling group.

6. The image down-sampling method of claim 1, wherein the first output pixel value is generated by pixel values of only a portion of the first pixels in the first down-sampling group.

7. The image down-sampling method of claim 1, wherein the first down-sampling group comprises pixels which are not down-sampled, and a number of the pixels of the first down-sampling group is odd times of a number of the first output pixel value.

8. The image down-sampling method of claim 1, wherein pixels of the sensing image are arranged as a Bayer pattern.

9. The image down-sampling method of claim 1, applied to a surveillance camera, wherein the surveillance camera does not perform the image down-sampling method in a normal mode, and performs the image down-sampling method in a standby mode.

10. An image processing system, comprising:
   an image sensor, configured to generate a sensing image comprising a plurality of first pixels and a plurality of second pixels which are alternately arranged; and
   a processing circuit, configured to generate a first output pixel value according to at least one pixel value of at least one of the first pixels in a first down-sampling group;
   wherein the first down-sampling group comprises an odd number of pixels;
   wherein the processing circuit further generates a second output pixel value according to at least one pixel value of at least one of the second pixels in a second down-sampling group;
   wherein the first down-sampling group and the second down-sampling group share at least one pixel.

11. The image processing system of claim 10, wherein the first down-sampling group comprises an even number of the first pixels and an odd number of the second pixels.

12. The image processing system of claim 10, wherein the first down-sampling group comprises an even number of the second pixels and an odd number of the first pixels.

13. The image processing system of claim 10,
   wherein the first down-sampling group comprises an even number of the first pixels and an odd number of the second pixels;
   wherein the second down-sampling group comprises an even number of the second pixels and an odd number of the first pixels.

14. The image processing system of claim 10, wherein the first output pixel value is generated by averaging pixel values of at least two of the first pixels in the first down-sampling group.

15. The image processing system of claim 10, wherein the first output pixel value is generated by pixel values of only a portion of the first pixels in the first down-sampling group.

16. The image processing system of claim 10, wherein the first down-sampling group comprises pixels which are not down-sampled, and a number of the pixels of the first down-sampling group is odd times of a number of the first output pixel value.

17. The image processing system of claim 10, wherein pixels of the sensing image are arranged as a Bayer pattern.

18. The image processing system of claim 10, applied to a surveillance camera, wherein the surveillance camera does not down sample the sensing image in a normal mode, and down samples the sensing image in a standby mode.

* * * * *